United States Patent [19]
Bartz

[11] Patent Number: 5,881,091
[45] Date of Patent: Mar. 9, 1999

[54] SPREAD SPECTRUM LINEARIZATION FOR DIGITIZING RECEIVERS

[75] Inventor: Manfred U. Bartz, Snohomish, Wash.

[73] Assignee: Hewlett-Packard Company, Palo Alto, Calif.

[21] Appl. No.: 595,886

[22] Filed: Feb. 5, 1996

[51] Int. Cl.[6] .................................................. H04B 15/00
[52] U.S. Cl. .......................................... 375/200; 375/285
[58] Field of Search .................................... 327/306, 316, 327/317; 332/150, 159–163; 375/200, 206, 367, 285; 455/102, 108, 114–115, 125, 126

[56] References Cited

U.S. PATENT DOCUMENTS

| | | | |
|---|---|---|---|
| 4,649,549 | 3/1987 | Halpern et al. | 380/32 |
| 5,161,044 | 11/1992 | Nazarathy et al. | 359/157 |
| 5,243,622 | 9/1993 | Lux et al. | 375/200 |
| 5,357,541 | 10/1994 | Cowart | 375/200 |
| 5,386,198 | 1/1995 | Ripstrand et al. | 330/52 |
| 5,463,357 | 10/1995 | Hobden | 332/151 |
| 5,629,703 | 5/1997 | Lewallen | 341/155 |
| 5,659,622 | 8/1997 | Ashley | 381/94 |

*Primary Examiner*—Stephen Chin
*Assistant Examiner*—Joseph Round Tree

[57] ABSTRACT

Second order distortion products in a digital receiver front end are converted into broadband noise. An illustrative embodiment includes a noise generator, first and second combiners, and a non-linear device (e.g., an analog-to-digital converter). An input signal is combined with the noise signal by the first combiner, and the combined signal is applied to the non-linear device. The output signal from this device is applied to the second combiner. The second combiner is also driven with a time-delayed version of the noise signal, and performs a reconstructive multiplication, synchronously recovering the desired output signal. Even-order distortion products introduced by the non-linear device persist only as a low level of wideband noise in the final output signal.

26 Claims, 2 Drawing Sheets

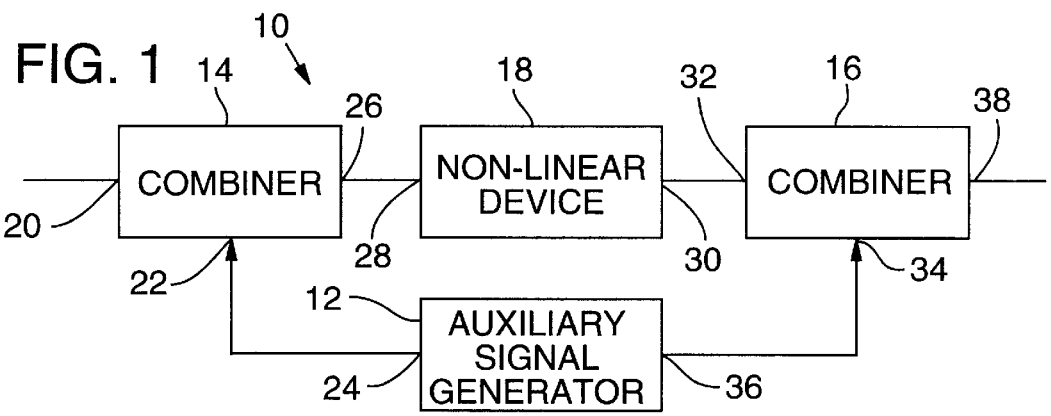
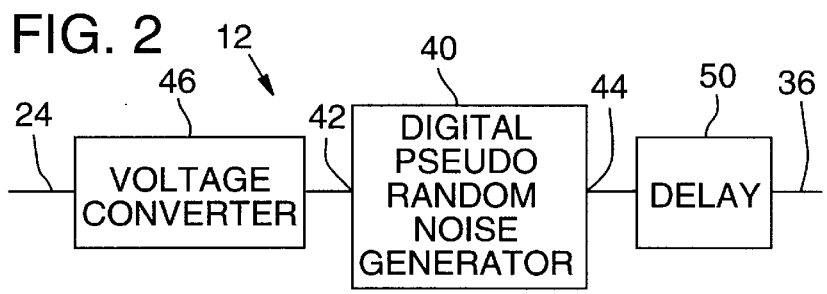
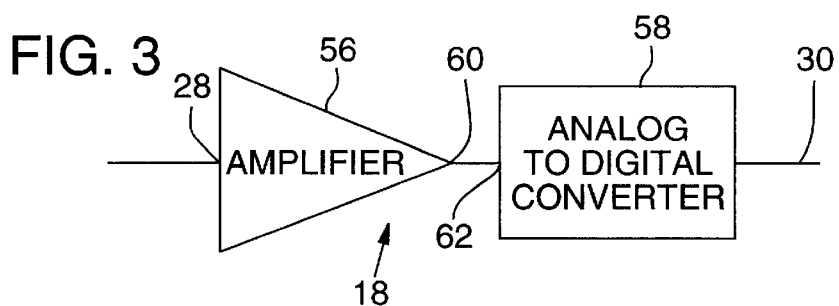
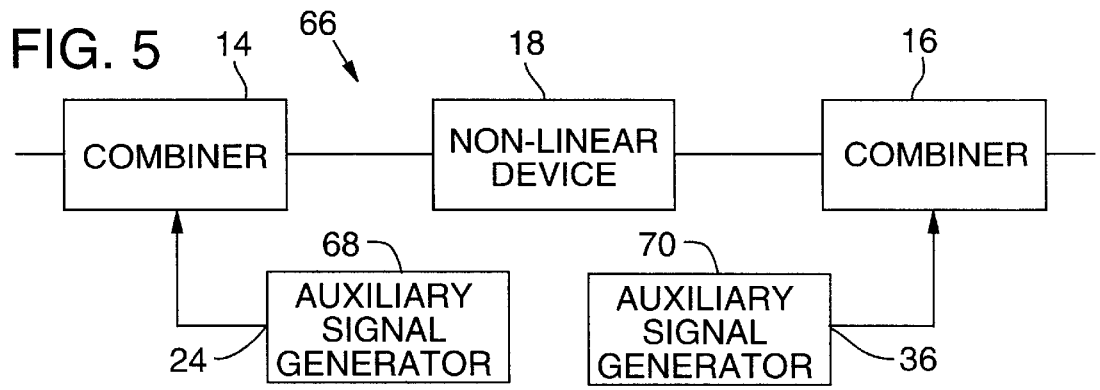

SPREAD SPECTRUM LINEARIZATION FOR DIGITIZING RECEIVERS

FIELD OF THE INVENTION

The present invention relates to reducing spurious signals from non-linear devices, and more particularly relates to methods and apparatuses for transforming even-order distortion products produced by such devices into broadband noise.

BACKGROUND AND SUMMARY OF THE INVENTION

A common problem in designing receiver circuitry is reducing distortion in the receiver's front end. The non-linearity of the receiver components creates spurious waveforms (distortion) that impair the circuit's overall performance. In measurement instrumentation, for example, such spurious waveforms can be confused with or even mask the actual signals being measured.

Any non-ideal device produces a number of distortion products, the most important of which are often second and third harmonics, and second and third order intermodulation distortion. Typically, second order distortion is caused by asymmetry in the output waveform due to non-linear processing of a signal's positive- and negative-going excursions. Third-order distortion is caused by variation in the transfer function of a component with the magnitude of the applied signal.

Third-order distortion can be reduced by driving the device with a smaller signal, or by using a device with a larger dynamic range. In either case, the input signal excursions result in smaller changes in the devices transfer function, thereby resulting in less third-order distortion.

Eliminating second-order distortion, however, has traditionally been more difficult. One way to reduce second-order distortion is to use balanced devices. Balanced devices, however, are never truly balanced. Due to fabrication tolerances, thermal effects and other phenomena, even the most precise (aka expensive) balanced devices have some inherent asymmetry. With this asymmetry comes even-order distortion.

Another approach for controlling second-order distortion is use of a feedback circuit. In such an approach, distortion error is theoretically subtracted out by a feedback signal mixed with the input signal. This method, however, is limited by the gain and non-linearity of the receiver circuit.

As receivers and other electronic circuitry become optimized in other respects, the problem of second order distortion increases in prominence. It is an object of the present invention to address this problem.

In accordance with a preferred embodiment of the invention, even-order distortion products from an electronic device are spectrally redistributed as broadband noise. By spreading the distortion energy over the entire frequency spectrum, the distortion's impact is reduced. Further, conversion of the distortion to broadband noise permits use of known digital signal processing techniques to discern and recover signals below the noise level.

In the preferred embodiment, an auxiliary signal generator generates a pseudo random noise signal that changes between a logic ±1. This signal is combined with an input signal in a combiner, such as a multiplier, creating a combined signal having the appearance of broadband noise. This combined signal is then processed by a non-linear device, such as an amplifier or an analog-to-digital converter. After this processing, the signal is synchronously reconstructed by combining the processed signal in a second combiner with the inverse of the auxiliary signal applied to the first combiner. The result is to recover the desired signal while spreading the distortion over the frequency spectrum.

The foregoing and other features and advantages of the present invention will be more readily apparent from the following detailed description, which proceeds with reference to the accompanying drawings.

BRIEF DESCRIPTION OF THE DRAWINGS

FIG. 1 is a block diagram of a spread spectrum linearization circuit according to one embodiment of the present invention.

FIG. 2 is a block diagram of a preferred auxiliary signal generator.

FIG. 3 is a block diagram of a non-linear device used in FIG. 1.

FIG. 5 is a block diagram of a spread spectrum linearizer using two auxiliary signal generators.

DETAILED DESCRIPTION OF THE PREFERRED EMBODIMENT

Figure 4A:
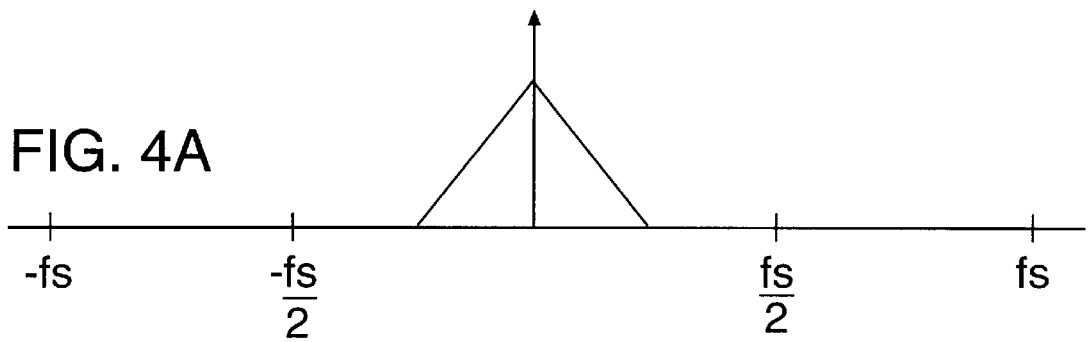
FIGS. 4A–D are spectral plots showing how second order distortion products are distributed as wide band noise by the embodiment of FIG. 1.

Referring to FIG. 1, a spread spectrum linearizer 10 according to one embodiment of the present invention includes an auxiliary signal generator 12, first and second combiners 14, 16, and a non-linear device 18 to be linearized.

The first combiner has two inputs, 20, 22. The first input is coupled to the electrical signal to be processed, while the second input is coupled to a first output 24 of the auxiliary signal generator 12. The output of the combiner 26 is coupled to the input 28 of the non-linear device 18.

The non-linear device's output 30 is coupled to the first input 32 of the second combiner 16. The second combiner also has a second input 34 coupled to the second output 36 of the auxiliary signal generator 12. The output 38 of the second combiner delivers a processed electrical signal with reduced distortion.

FIG. 2 is a block diagram of an auxiliary signal generator 12 that can be used in FIG. 1. The auxiliary signal generator includes a digital pseudo random noise generator 40 which creates a random pattern of digital 1's and 0's. The noise generator contains two single bit outputs 42, 44 that are inverse versions of each other. Voltage converter 46 is used to modify the voltage level of pseudo random noise generator output 42 to a logic ±1. A delay 50 is used to synchronize the auxiliary output signal 36 with the delay between the first and second combiners 14, 16. Thus, auxiliary output 36 is the inverted time-shifted version of auxiliary output 24. As a result, the inverted auxiliary signal 36 applied to the second combiner 16 is an inverted version of the same signal with which the input signal was earlier processed in combiner 14.

FIG. 3 is a block diagram of an exemplary non-linear device 18. The illustrated device includes an amplifier 56 coupled to an analog-to-digital converter (ADC) 58. The input 28 to amplifier 56 is driven by the output signal 26 from the combiner 14. The output 60 of the amplifier is applied to an input 62 of the analog-to-digital converter 58. The non-linear characteristics of the amplifier and analog-to-digital converter create spurious waveforms in the processed signal.

It will be recognized that the principles of the present invention can advantageously be employed in conjunction with a variety of different non-linear devices 18, not limited to the one particular illustrated.

The illustrated first combiner 14 (FIG. 1) is an analog multiplier, so that the signal on the output terminal 26 thereof is the product of the input signal on input terminal 20 and the output 24 of auxiliary signal generator 12. Preferably, a two four-quadrant multiplexer will be used, such as an analog multiplexer manufactured by Analog Devices.

The illustrated second combiner 16 is a digital multiplier so that the signal on output terminal 38 thereof is the product of the output 30 of the nonlinear device 18 and the output 36 of the auxiliary signal generator 12.

The second combiner 16 synchronously reconstructs the desired signal from the apparent noise and distortion provided by the non-linear device 18. More particularly, the second combiner effects a multiplication operation which, due to the inversion of one of the multiplicands, results in recovery of the desired amplified signal from the output 30 of device 18.

FIG. 4 depicts the frequency spectra of certain signals present in the illustrated embodiment that will aid in understanding of the above-described operations.

Figure 4B:
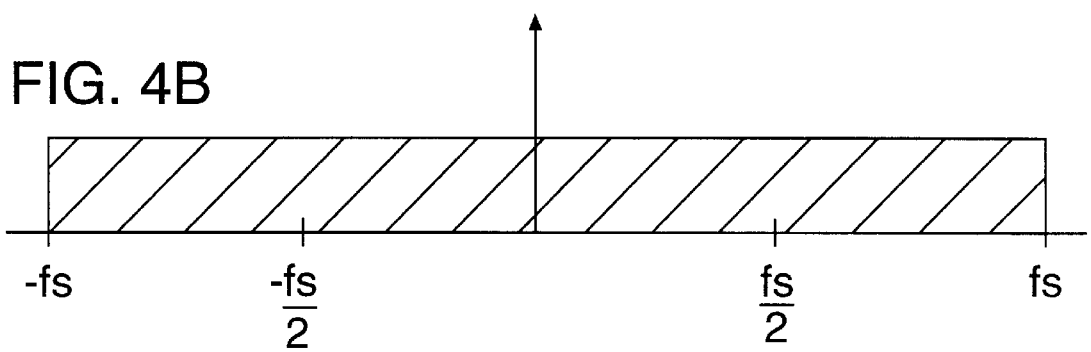
Figure 4C:
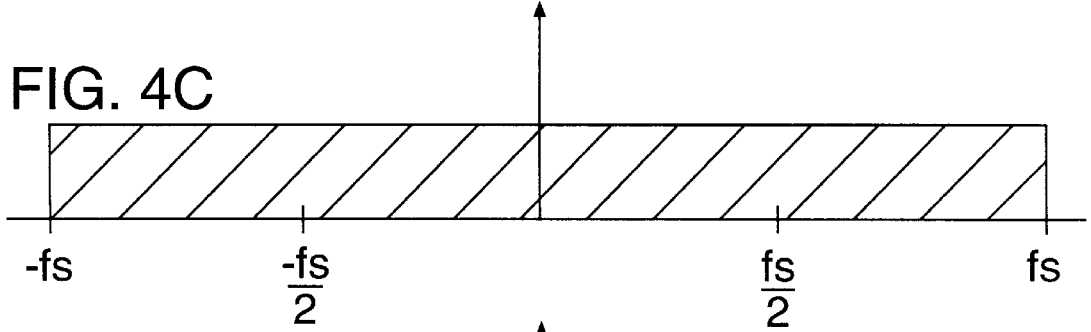
Figure 4D:
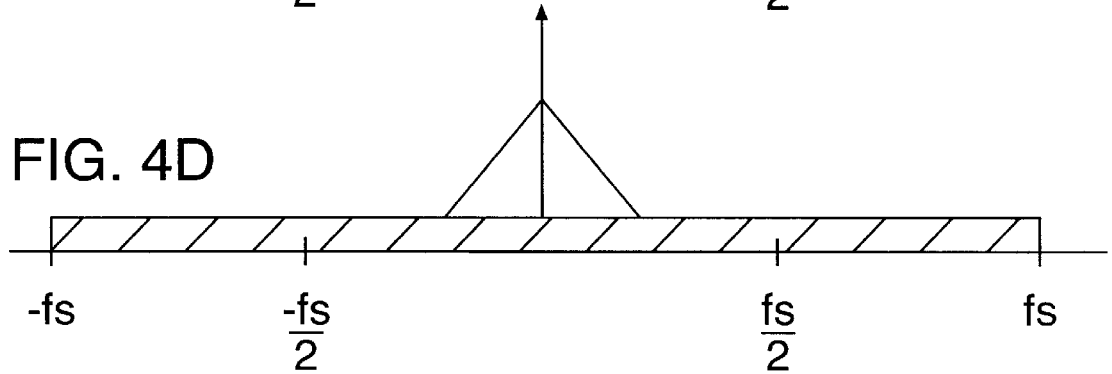

FIG. 4A shows the spectral composition of an illustrative input signal. FIG. 4B shows the broadband noise provided to the first combiner 14 by the auxiliary signal generator 12. FIG. 4C shows the spectral composition of the output signal from the first combiner 14, illustrating the smearing of the FIG. 4A input signal across the noise spectrum of FIG. 4B. FIG. 4D shows the spectral composition of the final output signal from the second combiner 16, illustrating the accurate recovery of the input signal, and the distribution of non-linear distortion products as a low level (exaggerated for illustration) of wideband noise.

A second embodiment 66 of the invention is shown in FIG. 5. In this embodiment, two separate auxiliary signal generators 68, 70 are used to create auxiliary signals 24, 36. As before, auxiliary signal 36 is a time-shifted inverted version of auxiliary signal 24.

The mathematical justification for recovery of the input signal, but not the distortion, is best shown by example.

Assume an input signal is given by $$x = \cos(wt) \quad (1)$$

whose sampled representation is given by $$x_n = \cos(nwT); \; n = 0 \to \infty \quad (2)$$

At the multiplier, the undistorted input signal is multiplied by a square wave of +/−1 amplitude at half the sample frequency of the system (fs/2). The signal is amplified and digitally sampled by the ADC. In most receiver sections the distortion is introduced at this stage and is modeled by a nonlinear transformation given by:

$$V = ax + bx^2 + cx^3 + d \quad (3)$$

where x corresponds to the composite input signal. (The composite signal being the product of the square wave and original input signal). This transformation contains second and third order terms to model the 2nd and 3rd order distortion contribution.

The output of the ADC produces a digitally sampled version of the composite signal consisting of the product of the square wave with period of fs/2 and the input signal. This can be represented mathematically by observing each of the terms of the transformation as follows. The linear term of the sampled signal is represented as:

$$ax_n = a\cos(nwT)(-1)^n; \; n = 0 \to \infty \quad (4)$$

If this signal undergoes a second digital multiplication by a synchronous digital signal of alternating +/−1 at half the sample rate fs/2, then the result would be the complete recovery of the original input signal yielding:

$$ax_n = a\cos(nwt)(-1)^{2n} \quad (5)$$

$$ax_n = a\cos(nwt) \quad (6)$$

which is the digitally sampled representation of the analog input signal.

If the multiplying signal at the input and output of the ADC had consisted of synchronous random alternating signal of +/−1 polarity this result would be unchanged.

For the second order term $$bx_n^2 = b[\cos(nwT)(-1)^n]^2 \quad (7)$$

$$bx_n^2 = b[\cos^2(nwT)] \quad (8)$$

$$bx_n^2 = \tfrac{1}{2}b[1 + \cos(2nwT)] \quad (9)$$

If this sampled representation of the 2nd order distortion term at the output of the ADC is also multiplied by a synchronous digital multiplying signal of +/−1 at fs/2 this would yield:

$$bx_n^2 = \tfrac{1}{2}b[1 + \cos(2nwT)](-1)^n] \quad (10)$$

This result still contains the +/−1 multiplying term. In the implementation of the invention, the multiplying signal is actually a random signal changing from +/−1 at fs/2. The result of multiplying by a random signal which randomly changes from +/−1 at fs/2 yields a signal which in the frequency domain is spread uniformly across the frequency spectrum as noise. Hence the energy of the second order distortion term is converted from a single frequency point distortion to wideband noise. This does not occur with the linear term corresponding to the original input signal.

Performing the same operation with the third order term results in:

$$cx_n^3 = c[\cos(nwT)(-1)^n]^3 \quad (11)$$

$$cx_n^3 = c[\cos^3(nwT)(-1)^3n] \quad (12)$$

$$cx_n^3 = \tfrac{c}{4}[3\cos(nwT) + \cos(3wnT)](-1)^n] \quad (13)$$

If we again perform a second synchronous digital multiplication of $(-1)^n$, the result is $$cx_n^3 = \tfrac{c}{4}[3\cos(nwt) + \cos(3wnT)] \quad (14)$$

which is the sampled version of the third term which contains the third harmonic of cos3wt.

Similar results can be shown for higher order terms which will show that this invention converts the distortion of all even ordered terms into noise, while leaving the original and odd ordered terms in place.

It is preferable in most instances to change the state of the pseudo random signal at a random rate. This overcomes the above-noted bandwidth constraint, and thereby makes better use of the bandwidth of the ADC.

From the foregoing discussion, it will be recognized that the present invention affords an advantageous method and apparatus for reducing distortion products without the sensitive balancing or feedback issues associated with prior art "solutions."

Having described and illustrated the principles of our invention with reference to preferred embodiments thereof, it will be apparent that these embodiments can be modified in arrangement and detail without departing from the principles of the invention.

For example, while the invention has been illustrated with reference to a single-bit pseudo random noise generator, it will be recognized that alternative embodiments can employ noise generators that output streams of multi-bit noise "words." Likewise, while the invention has been illustrated with reference to digital noise sources, it will be recognized that artisans can modify the detailed embodiments to utilize analog noise sources as well.

Still further, while the invention has been illustrated with reference to mixing the input signal with a pseudo random signal, it will be recognized that other mixer signals, including non-random signals, can be employed instead (with a consequent change in the spectral redistribution of the distortion products).

While the invention has been described with reference to hardware circuit elements, some or all of the devices shown in the Figures can be implemented by corresponding software routines executed on a suitably powered microprocessor.

In view of the wide variety of embodiments to which the principles of my invention can be applied, it should be apparent that the detailed embodiments are illustrative only and should not be taken as limiting the scope of my invention. Rather, I claim as my invention all such modifications as may come within the scope and spirit of the following claims and equivalents thereto.

I claim:

1. In a digitizing receiver that includes a non-linear device in a front end thereof, a method of reducing undesired spectral components due to the non-linearity of said device, the method comprising:
   providing an input signal;
   combining said input signal with a first wideband signal to produce a combined signal;
   applying the combined signal to the non-linear device in said receiver front end to produce an intermediate output signal; and
   processing the intermediate output signal with a second wideband signal to recover from the intermediate output signal a final output signal, said second wideband signal being related to the first wideband signal;
   wherein spectral components due to the non-linearity of the non-linear device are spectrally smeared and appear in the final output signal as wideband noise.

2. The method of claim 1 in which the first and second wideband signals are pseudo random noise signals.

3. The method of claim 2 in which the first and second wideband signals change values only at periodically recurring instants.

4. The method of claim 2 in which the first and second wideband signals change values at random instants.

5. The method of claim 1 in which the first wideband signal is a scaled, time-shifted version of the second wideband signal.

6. In a digitizing receiver that includes a non-linear device in a front end thereof, the non-linear device being coupled to an input node and having an output coupled to an output node, an apparatus for reducing undesired spectral components due to the non-linearity of said device, the apparatus comprising:
   a wideband signal generator having first and second outputs;
   a first combiner, said first combiner having a first input coupled to the input node, a second input coupled to the first wideband signal generator output, and an output coupled to an input of the non-linear device in the front end of said digitizing receiver; and
   a second combiner, said second combiner having a first input coupled to an output of the non-linear device, a second input coupled to the second wideband signal generator output, and an output coupled to said output node;
   wherein the first and second combiners cooperate to smear spectral products due to the non-linearity of said non-linear device into wideband noise provided to the output node.

7. The digitizing receiver of claim 6 in which at least one of said first or second combiners is an analog multiplier.

8. The digitizing receiver of claim 7 in which at least one of said first or second combiners comprises a pair of emitter-coupled transistors in a current-steering topology.

9. The digitizing receiver of claim 6 in which at least one of said first or second combiners is a digital multiplier.

10. The digitizing receiver of claim 6 in which the first combiner is an analog multiplier, and the second combiner is a digital multiplier.

11. The digitizing receiver of claim 6 in which the wideband signal generator is a pseudo random noise generator.

12. The digitizing receiver of claim 6 in which the non-linear device includes an analog-to-digital converter.

13. The digitizing receiver of claim 6 in which the wideband signal generator includes a signal generator circuit having a signal output, said signal output serving as the first output, the wideband signal generator further including a delay circuit having an input coupled to the first output and having a delay circuit output, said delay circuit output serving as the second output.

14. A method for reducing distortion products introduced during processing of an input signal by a non-linear device or non-linear system, comprising the steps of:
   combining a noise signal with the input signal;
   processing the combined noise and input signal with said non-linear device or non-linear system; and
   combining the inverse of the noise signal with the processed combined noise and input signal to provide an output signal with a reduction in the amplitude of distortion products introduced during processing.

15. The method of claim 14 including generating the noise signal using a wideband signal generator.

16. The method of claim 14 where the first combining step includes combining the input and noise signals in an analog multiplier.

17. The method of claim 14 where the second combining step includes combining the inverse noise signal with the processed combined signal in a digital multiplier.

18. The method of claim 14 where the processing step includes applying the combined noise and input signals to a non-ideal device.

19. The method of claim 18 in which the non-ideal device includes an analog-to-digital converter.

20. The method of claim 14 where the inverse noise signal is a scaled, time-shifted version of the noise signal.

21. The method of claim 1 wherein said processing includes multiplying the intermediate output signal with the second wideband signal.

22. The method of claim 1 wherein said processing includes digitally multiplying the intermediate output signal with the second wideband signal.

23. The method of claim 1 wherein said combining includes multiplying the input signal with the first wideband signal.

24. The method of claim 1 wherein the non-linear device includes an analog-to-digital converter.

25. The method of claim 1 wherein distortion products due to said non-linearity are not subtracted from the intermediate output signal, but are instead changed in frequency.

26. The method of claim 14 wherein said reduction in distortion products is achieved by spectrally transforming energy in at least certain of said distortion products to wideband noise.

* * * * *